June 16, 1964 S. H. COES 3,137,590
METHOD OF MAKING COLD ENDS FOR SILICON CARBIDE RESISTOR BARS
Original Filed July 22, 1957

INVENTOR.
SAMUEL H. COES
BY
Allan R. Redrow
ATTORNEY 3,137,590
METHOD OF MAKING COLD ENDS FOR SILICON CARBIDE RESISTOR BARS
Samuel H. Coes, Northboro, Mass., assignor to Norton Company, Worcester, Mass., a corporation of Massachusetts
Continuation of application Ser. No. 673,283, July 22, 1957. This application July 19, 1960, Ser. No. 43,900
9 Claims. (Cl. 117—201)

The invention relates to silicon carbide resistors with cold ends. Such resistors are used as the heating elements in electric furnaces, being capable of sustained operation at temperatures of 1400° C. and higher in ordinary air atmosphere.

This application is a continuation of my application Serial No. 673,283, filed July 22, 1957, now abandoned.

One object of the invention is to provide a resistor of the character indicated the ends of which will run cool. Another object of the invention is to provide a method for making cold ended silicon carbide resistors achieving economies in manufacture. Another object is to make cold ends with a negative temperature coefficient of resistance. Another object is to make cold ends of low resistivity. Another object of the invention is to simplify the manufacturing operation. Another object is to make clean cold ends with little trouble.

Other objects will be in part obvious or in part pointed out hereinafter.

In the accompanying drawings,

FIGURE 1 is an elevation with legends thereon of a resistor of the preferred form according to my invention, exemplifying the best mode thereof.

FIGURE 2 similarly illustrates another embodiment of the invention which has certain advantages.

Example I

I procure silicon carbide of the very pure green variety, which is over 99% silicon carbide, SiC. This is a commodity of commerce and the manufacture thereof is another field of invention altogether so it need not be described herein. I select a mixture of coarse and fine grain, 30% of 28 mesh size 20% of 54 mesh size 16% of 120 mesh size. In this specification all percentages are by weight unless the contrary is stated. To a thorough mixture of this coarse and fine grain silicon carbide, the mixing whereof can be done in any mixing machine, I add and thoroughly mix 15 cc. per pound on the silicon carbide of dilute water glass. This water glass is diluted with 2 parts of water to 1 part of the water glass. The water glass as received, before the dilution, is $Na_2O_3 \cdot 2SiO_2$ one part, water 2 parts.

This green (in color, a light green to nearly colorless) variety of silicon carbide is a hexagonal form of silicon carbide. The gray and the black varieties could be used but better results are achieved using the green variety. The gray and the black varieties exist in the hexagonal form. The other form is the cubic form not ordinarily used for the manufacture of the porous bar. It should be noted, however, that cubic silicon carbide is to be found in the cold end structure of some commercial resistor bars.

Figure 3:
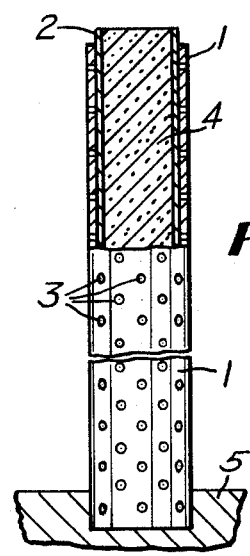
FIGURE 3 is a view partly in elevation and partly in axial section of the tamping tube for making bars out of silicon carbide grain.

This mixture is then molded into a long cylindrical bar by the procedure and with the mold disclosed in U.S. Patent to Eichenberger 1,765,572. Referring to FIGURE 3, a steel tube 1 is provided with a liner of paper 2 and the steel tube has perforations 3 throughout its surface. The silicon carbide and water glass mixture 4 is poured into the tube 1 which rests against an anvil 5. The mixture is added slowly and is tamped in the tube 1 with a steel rod, adding more mixture from time to time until the tube 1 is filled. The inside diameter of the paper lining 2 should be 2% greater than the diameter of the resistor to be formed to allow for shrinkage and the tube 1 should be of a length 2% greater than the resistor bar to be formed for the same reason. The final bars of FIGURE 1 with hot zones 11 and cold ends 12 are thirty-five inches long and one and one-quarter inch in diameter throughout, and the cold ends 12 are nine and one-half inches long. This, of course, is merely illustrative because all sorts of sizes of heating bars are made and the relative lengths of the cold ends vary also.

The filling and tamping is continued, referring to FIGURE 3, until the tube 1 is filled with compacted mixture 4. Then the tube 1 is heated to a red heat, to wit to 600° C. which burns out the paper. The "green" bar can now be readily removed from the tube 1. The holes 3 are provided for the escape of gases during the heating. The water has of course disappeared and the bar can be readily handled because the sodium silicate cements the grains together.

This bar which is now in the green state, meaning that the silicon carbide is coherent but not recrystallized, is taken to a furnace to be recrystallized. Recrystallization of silicon carbide was first described so far as I am aware by Francis A. J. Fitzgerald in U.S. Patent No. 650,234, dated May 22, 1900.

Figure 4:
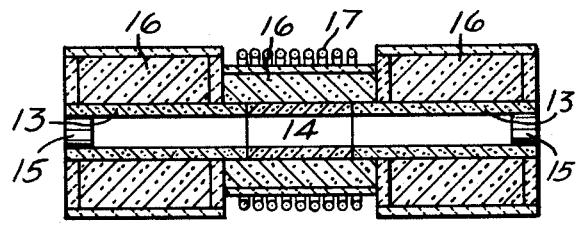
FIGURE 4 is an axial sectional view of an induction furnace for firing the bars.

A number of green bars are placed in a furnace tube 13, see FIGURE 4, such as the furnace tube of U.S. patent to A. J. Thompson, No. 2,188,693. This is a graphite furnace tube and the bars in it should be heated in accordance with this invention to a temperature of 2400° C. The furnace should be large enough to contain a load of bars in a fully heated zone of the furnace such as the zone 14. It is desirable also to plug the ends of this furnace tube 13 with graphite plugs 15 to maintain a reducing atmosphere of carbon monoxide in the furnace tube at all times. If the temperature of 2400° C. is maintained for one hour good quality bars will result. At this temperature and in fact starting about 2200° C., the silicon carbide recrystallizes, that is to say, the grains grow together to form a solid piece without melting. The furnace is allowed to cool and after the bars have cooled to a temperature at which they will not crack from heat shock, they are removed from the furnace and this part of the operation is then complete. These bars can be removed without cracking at temperatures as high as 500° C. using tongs. Further details of the Thompson furnace can be procured from his Patent No. 2,188,093, but any furnace can be used which will heat the bars to the temperature mentioned maintaining an atmosphere of carbon monoxide which is generated by the graphite tube 13 the carbon insulation 16 which combines with the oxygen contained in any air in the tube. Thompson heats his furnace by an induction coil 17. A recrystallizing temperature of between 2300° C. and 2500° C. can be used.

Now the bars are cold ended. I procure a kerosene emulsion of graphite. The graphite is colloidal graphite and when stirred into kerosene remains in suspension due to its fine particle size. The proportion of graphite to kerosene is not critical but was 10% graphite, the remainder kerosene. This can equally well be called a suspension of graphite in kerosene.

Using this suspension of graphite in kerosene I impregnate the pores of the cold ends 12 with graphite. This is done simply by immersing the ends of the bars 10 in the suspension to the depth of the cold ends, in this case nine and one-half inches. Any suitable container can be used for the purpose and naturally a number of bars will be immersed at one time to save labor. Then the bars are reversed end to end and the other ends are similarly treated. Each end should be immersed in the suspension for one hour and further immersion does no harm.

Then the bars are removed from the suspension of graphite and allowed to dry. They can be dried overnight at room temperature or if heated to 120° F. can be dried in two hours. The kerosene vollatilizes leaving the pores of the cold ends 12 partially filled with graphite.

Figure 5:
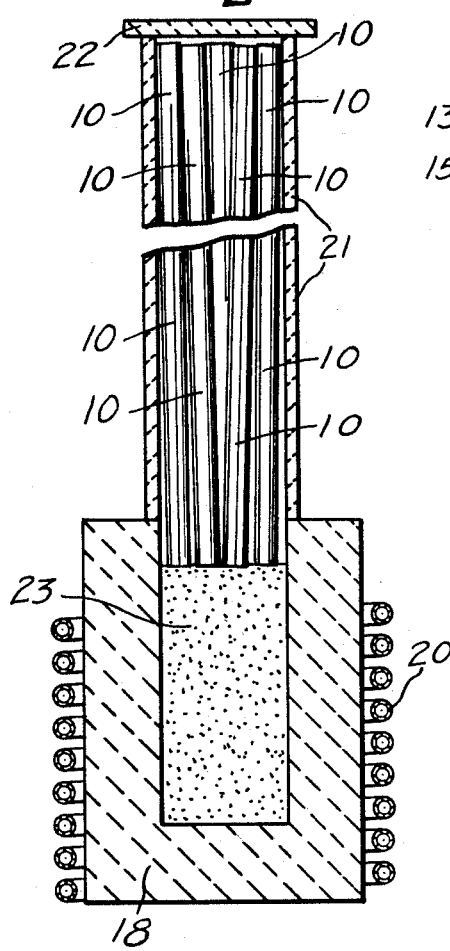
FIGURE 5 is an axial sectional view of a cold ending pot for cold ending the bars.

The bars are then placed in the cold ending pot shown in FIGURE 5, to be impregnated with molten silicon or molybdenum silicide. This pot 18 is made of graphite and has an inside diameter of six and one-quarter inches and is seventeen inches high. It is heated by an induction coil 20 on the outside, through which water is flowing as usual. This is a high frequency induction furnace. The induction coil 20 has a height of thirteen and a half inches. The molten molybdenum silicide and/or the molen silicon rise in the ends 12 a little above the initial liquid level due to capillarity.

On top of the pot rests a graphite tube 21 to act as a container for the bars 10, fifteen of which are placed in the pot 18 at one time with their upper portions in the tube 21. To retain the heat a graphite plate 22 is placed on the top of the tube 21 when the bars 10 are in it.

But before the bars 10 are placed in the pot 18, it is partly filled with molybdenum silicide in granular form. The particle size can be almost anything but I have used particles passing through a sixteen mesh screen and retained on a sixty mesh screen. The mass of granular molybdenum silicide is indicated at 23 with the bars 10 resting upon it. The amount of molybdenum silicide to use in this embodiment of the invention is 9666 grams. To this I add 2% by weight (can be from 1% to 3%) of boron carbide, 48 grams. This is added as fine powder (could be anything so long as not too big to fit in place). However, good cold ends according to the invention, can be made adding no boron carbide. Boron carbide reduces the resistivity of the cold ends somewhat. The specific gravity of the molybdenum silicide that I used is 10 and the boron carbide, 2.5.

The graphite pot 18 is heated by induction. The temperature of the molybdenum silicide and boron carbide is raised to 2200° C. in the course of which they melt and the bars 10 sink down into the melt. The molybdenum silicide and boron carbide fill the pores of the cold ends 12, remaining after the impregnation with graphite as above described. The bars before impregnation with anything were substantially 99% silicon carbide with a density between 2.1 and 2.2 and a modulus of rupture between 3000 and 6000 pounds per square inch. The porosity of the bars was originally close to 33%, this being by volume, and the porosity can only be measured in volume. This porosity can be from 25% to 50%. As a result of the second treatment the pores of the cold ends 12 are substantially filled. The graphite reacts with some of the silicon of the molybdenum silicide to form silicon carbide. The pot 18 is then allowed to cool to about 500° C. and the operation is repeated turning the bars from end to end, replacing them in the pot 18 and repeating the operation to fill the opposite cold ends 12 with molybdenum silicide and boron carbide. This, when the pot 18 has again cooled and the bars have been removed, completes the manufacture of the bars 10 with hot zones 11 and cold ends 12.

The electric resistivity of the cold ends 12 as above made was 0.00466 ohm-centimeter or 150% above that of the standard silicon and boron carbide impregnated silicon carbide ends. These bars were tested in a standard test furnace and the temperature under the terminal straps averaged 30° C. cooler than the ends under the straps of bars with the standard silicon impregnated cold ends.

Previous resistor bars made by my company are quite satisfactory but for some furnaces the cold ends were a bit too hot. Tests showed they ran to about 300° C. in most cases and as they were satisfactory for most furnaces, a slight lowering of the temperature makes a great improvement.

*Example II*

As another example of the invention which may be preferred in some cases, I proceed exactly as in the case of Example I but partially fill the pot 18 with silicon, and boron carbide, 2320 grams of silicon (specific gravity 2.4) and 46 grams (2% by weight) of boron carbide. Any reasonable particle sizes can be used. This also produces a bar, the ends of which run about 30° C. colder than the standard silicon impregnated cold end and the other figures are the same. The graphite reacts with some of the silicon to form silicon carbide.

Figure 1:
Figure 2:
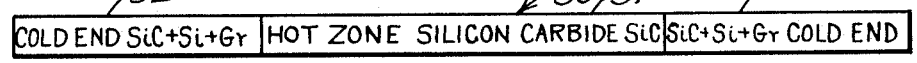

This procedure makes a bar 30 having a hot zone 31 and cold ends 32 as shown in FIGURE 2. In FIGURES 1 and 2 the legends are plain enough, and the symbols are chemical symbols with Gr standing for graphite; however, MoSi does not mean all molybdenum monosilicide. It is indefinite as any molybdenum silicide can be used and the material procured was partly the monosilicide and partly the disilicide in unknown proportions. But it was all a compound of molybdenum and silicon except for impurities, probably mostly silicon. It had enough silicon so that when some of it reacted with the graphite the remainder was still all molybdenum silicide. This commercial material is satisfactory while pure compounds are very expensive and there is no reason to use them. It is correct to call it molybdenum silicide. It is not only the elemental silicon impurities in this silicide that reacts with the graphite, but also some of the Si of $MoSi_2$.

The advantage of using molybdenum silicide is that it impregnates the cold ends better, leaves a cleaner surface and we get more uniform results using it in the matter of obtaining complete impregnation but leaving no excess of the silicide on the surface of the bar. An excess of impregnant causes the bar to stick in the holes in the furnace. The advantage of using silicon is that it is about one-third as expensive as molybdenum silicide and weighs less than one-quarter as much. A lightweight bar is in less danger of being broken. Each embodiment of the invention will probably be used.

In order to give the best mode of the invention and the best secondary example succinctly, I have been specific but variations can be made within the scope of the invention. For different sizes of bars, different mesh sizes of grain will be used, the larger the bar the coarser the material that can be used, but there should be some fines as compared to the coarse material. It is impossible to give any kind of a range here and this is not at the crux of the present invention so I shall not attempt any range but say that as this is a known art, the invention is not limited thereto. The various apparatus described are illustrative only and others can be used. Other temporary binders than sodium silicate can be used such as methyl cellulose. Many other temporary binders can be used and I have not explored the list. In the subsequent firing operation all or most of the temporary binder disappears. The $Na_2O$ of the sodium silicate goes off as so does most of the silica.

The size of the bars can be anything, limited only by the wants of the users and ability of the manufacturer to make them. Nor is there any set proportion for the relative length of the hot zone and of the cold ends, but the proportion given is normal for bars of that size. It is possible to impregnate bars by graphite by using a suspension of graphite in oils, such as lubricating oils or even organic oils. Kerosene is an oil and oil is more satisfactory than water, so I will claim the suspension of graphite in oil.

In Examples I and II the proportion by volume of the silicon carbide that is formed and the silicide or silicon was, as close as I know, 6 parts of silicon carbide to 94 parts of metal, by volume calling the molybdenum silicide and the silicon metals which is popular terminology. However, this could vary from 3 parts of the silicon carbide and 97 parts of the metal to 10 parts of the silicon carbide to 90 parts of the metal, by volume. Mixtures of molybdenum silicide and silicon in all proportions can be used.

The temperature of impregnation with graphite is limited only by the desirability of not burning the oil. It takes longer at lower temperatures but room temperature can be used.

The temperature of impregnating with metal was given as 2200° C. Higher temperature would drive off some of the metal and lower temperatures will not impregnate so well, as there should be a vapor phase to the metal. Anywhere from 2100° C. to 2300° C. is satisfactory. Upon reaching top temperatures the current is immediately turned off and this applies to both examples, and this stops the metal from rising too high in the bar making too long cold ends. The boiling point of silicon is commonly given as 2600° C., but there is a substantial vapor phase as low as 2100° C. I don't know the boiling points of the molybdenum silicides but we can operate within the range of temperature mentioned, as their boiling points are not too far from that of silicon.

An important feature of the invention using molybdenum silicide is that the cold ends have a negative temperature coefficient of resistance, whereas the ends impregnated with silicon and boron carbide have a positive coefficient. This from the $I^2R$ rule makes a negative temperature coefficient a great advantage in a cold end.

I prefer to make integral bars as described, in one piece from the start, as they can be made more cheaply. But some bars may be too long to make this way with a particular manufacturer's equipment. In that case the hot zone 11 or 31 is made, and the cold ends 12 or 32 are made in separate operations and then the latter are welded to the former by the procedure described in the patent to Kelleher, 1,588,473, and the patent to Heyroth, 2,319,323. As I don't have to do this in most cases and it is simply a manufacturing expedient pending procurement of larger equipment and as it is sufficiently described in the patents above cited, I need elaborate no further.

By following the procedures herein given, all of the advantages of the invention given in the objects and otherwise are achieved.

It will thus be seen that there has been provided by this invention silicon carbide resistors with cold ends and methods of making them in accordance with which the various objects hereinabove set forth together with many thoroughly practical advantages are successfully achieved. As various possible embodiments might be made of the mechanical features of the above invention and as the art herein described might be varied in various parts, all without departing from the scope of the invention, it is to be understood that all matter hereinbefore set forth or shown in the accompanying drawings is to be interpreted as illustrative and not in a limiting sense.

I claim:

1. A method of making a cold end for an electrical resistor bar, said end being formed of recrystallized silicon carbide material of hexagonal form by immersing it in a liquid suspension of graphite, removing the liquid, and then further impregnating the pores of the recrystallized silicon carbide with a material selected from the group consisting of molybdenum silicide and silicon, and mixtures thereof, by immersing it in a molten bath of said material, holding said bath at a temperature of between 2100° C. and 2300° C., and reacting the material and the graphite to form a small amount of silicon carbide in the pores and also leaving a majority of the material therein.

2. Method according to claim 1 in which the metal is molybdenum silicide.

3. Method according to claim 1 in which the metal is silicon.

4. A method of making a cold end for an electrical resistor bar, said end being formed of recrystallized silicon carbide material comprising the steps of impregnating the pores of the recrystallized silicon carbide by immersing it in a liquid suspension of graphite, removing the liquid, and then further impregnating the pores of the recrystallized silicon carbide with a material selected from the group consisting of molybdenum silicide and silicon, and mixtures thereof, by immersing it in a molten bath of said material, holding said bath at a temperature of between 2100° C. and 2300° C., and reacting the material and the graphite to form a small amount of silicon carbide in the pores and also leaving a majority of the material therein.

5. A method of making cold ends for resistor bars formed of recrystallized silicon carbide comprising the steps of impregnating the pores of the recrystallized silicon carbide bar with liquid graphite held in suspension, removing the liquid, and then further impregnating the pores of the recrystallized silicon carbide with material selected from the group consisting of molybdenum silicide and silicon, and mixtures thereof, by immersing the opposite ends of said bar in a molten bath of said material at a temperature of between 2100° C. and 2300° C., and reacting the material and the graphite deposited in said pores to form a small amount of silicon carbide in the pores leaving a majority of the material therein along with the silicon carbide which is formed.

6. A method of making cold ends for resistor bars formed of recrystallized silicon carbide comprising the steps of impregnating the pores of the recrystallized silicon carbide bar with colloidal graphite held in suspension in oil, said suspension including about 10% graphite with the remainder being kerosene, removing said kerosene, and then further impregnating the pores of the recrystallized silicon carbide with material selected from the group consisting of molybdenum silicide and silicon, and mixtures thereof, by immersing the opposite ends of said bar in a molten bath of said material at a temperature of between 2100° C. and 2300° C., and reacting the material and the graphite deposited in said pores to form a small amount of silicon carbide in the pores leaving a majority of the material therein along with the silicon carbide which is formed.

7. A method of making cold ends for resistor bars formed of recrystallized silicon carbide comprising the steps of immersing the cold ends of the bars in a suspension of colloidal graphite in kerosene for a period of about one hour to impregnate the pores of the recrystallized silicon carbide bar with said graphite, vaporizing the kerosene, and then further impregnating the pores of the recrystallized silicon carbide with material selected from the group consisting of molybdenum silicide and silicon, and mixtures thereof, by immersing the opposite ends of said bar in a molten bath of said material at a temperature of between 2100° C. and 2300° C., and reacting the material and the graphite deposited in said pores to form a small amount of silicon carbide in the pores leaving a majority of the material therein along with the silicon carbide which is formed.

8. A method of making cold ends for resistor bars formed of recrystallized silicon carbide having a porosity of from 25% to 50% by volume comprising the steps of impregnating the pores of the recrystallized silicon carbide bar with graphite held in liquid suspension, removing the liquid, and then further impregnating the pores of the recrystallized silicon carbide to substantially fill the pores with material selected from the group consisting of molybdenum silicide and silicon, and mixtures thereof, by immersing the opposite ends of said bar in a molten bath of said material at a temperature of between 2100° C. and 2300° C., and reacting the material and the graphite deposited in said pores to form a small amount of silicon carbide in the pores leaving a majority of the material therein along with the silicon carbide which is formed.

9. A method of making cold ends for resistor bars formed of recrystallized silicon carbide comprising the steps of impregnating the pores of the recrystallized silicon carbide bar with graphite held in liquid suspension, removing the liquid, and then further impregnating the pores of the recrystallized silicon carbide with material selected from the group consisting of molybdenum silicide and silicon, and mixtures thereof, by immersing the opposite ends of said bar in a molten bath of said material at a temperature of between 2100° C., and 2300° C., and reacting the material and the graphite deposited in said pores to form a small amount of silicon carbide in the pores leaving a majority of the material therein along with the silicon carbide which is formed.

References Cited in the file of this patent
UNITED STATES PATENTS

| | | |
|---|---|---|
| 1,121,601 | Allen et al. | Dec. 22, 1914 |
| 1,906,963 | Heyroth | May 2, 1933 |

FOREIGN PATENTS

| | | |
|---|---|---|
| 488,927 | Canada | Dec. 16, 1952 |